United States Patent [19]

Sayama et al.

[11] Patent Number: 5,262,023
[45] Date of Patent: Nov. 16, 1993

[54] METHOD FOR PRODUCING HYDROGEN AND OXYGEN FROM WATER

[75] Inventors: Kazuhiro Sayama; Hironori Arakawa, both of Tsukuba, Japan

[73] Assignee: Director-General of Agency of Industrial Science and Technology, Tokyo, Japan

[21] Appl. No.: 932,255

[22] Filed: Aug. 19, 1992

[30] Foreign Application Priority Data

Aug. 20, 1991 [JP] Japan .................. 3-232157

[51] Int. Cl.$^5$ .................. C01B 3/02; C01B 13/02
[52] U.S. Cl. .................. 204/157.5; 204/157.52
[58] Field of Search .................. 423/657; 204/157.5, 204/157.52

[56] References Cited

U.S. PATENT DOCUMENTS 4,005,185 1/1977 Ishizaka .................. 423/657
4,889,604 12/1989 Khan et al. .................. 204/157.5

FOREIGN PATENT DOCUMENTS 35402 2/1988 Japan .................. 204/157.52

OTHER PUBLICATIONS

Sato et al., *Journal of Catalysis* 69, 128–139 (1982).
Kiwi et al., *Journal of Molecular Catalysis* 39 (1987), 63–70.
Kudo et al., *Journal of Catalysis* 111, 67–76 (1988).
Domen et al., *Journal of Catalysis* 102, 92–98 (1986).
Kawai et al., *Chemical Physics Letters* vol. 72, No. 1 (May 15, 1980) 87–89.
Inoue et al., *J. Phys. Chem.* 1991, 95, 4059–4063.

*Primary Examiner*—Wayne Langel

[57] ABSTRACT

There is disclosed a method for producing hydrogen and oxygen photocatalytically from water, which comprises bringing an aqueous solution of carbonate into contact with a semiconductor carrying a metal or a metal compound and irradiating the aqueous solution with light.

12 Claims, No Drawings

METHOD FOR PRODUCING HYDROGEN AND OXYGEN FROM WATER

FIELD OF THE INVENTION

The present invention relates to a method for producing hydrogen and oxygen effectively from water by using light energy.

More particularly, the present invention relates to a method for producing hydrogen and oxygen from water which comprises bringing an aqueous solution of carbonate into contact with a semiconductor carrying a metal or a metal compound and irradiating the aqueous solution with light to allow a catalytic uphill reaction represented by the below-mentioned equation to proceed.

$$2H_2O \rightarrow 2H_2 + O_2$$

BACKGROUND OF THE INVENTION

There is a great deal of interest in techniques for photolyzing water into hydrogen and oxygen by using a semiconductor photocatalyst from the standpoint of light energy conversion, and the technologies have long been studied on basic research levels at universities and the like.

However, many studied examples involve many problems: for instance, (1) the activity is very low, (2) the reverse reaction is occurred largely, (3) the deactivation is caused quickly, (4) the preparation of the catalyst and the reaction conditions are troublesome, (5) the reproducibility is poor, and (6) it is doubtful whether the reaction proceeds catalytically. Therefore, these examples are far from the practical application.

Since the first (1973) and second (1978) oil crises the development of substitute energy for oil has been a pressing need among industrially developed countries.

Specifically, (1) atomic energy, (2) coal, natural gas, oil shale, and tar sand, (3) solar energy, water power, geothermal energy, wind force, and the like are studied. However, since recently the problem of the earth's environment is being highlighted, and in particular the major cause of warming of the earth is carbon dioxide given off from energy systems, the use of energy from the fossil sources mentioned under (1) and (2), not to mention oil, cannot help but decrease from now on. Therefore, attention is now being given to the so-called clean energy under (3).

Among these, solar energy alone is only considered enough to supply the amount of energy that is now used. For example, it is said that the solar energy reaching the earth in a year is about $2.8 \times 10^{24}$ J, which is 10,000 times the amount of energy consumed by all people on the earth in a year.

To utilize solar energy practically, there are a method wherein solar energy is used as a heat source by a solar house or the like, and a method wherein solar energy is converted to other energy. The most advanced developed technique for solar energy conversion employs a solar cell, and the energy conversion efficiency of solar cells is on the order of 15%, but since the production cost of solar cells is high at present, energy problems cannot be solved only by solar cells.

It is said that the energy culture that will follow the current oil culture is a hydrogen culture. This is because if water is used as a hydrogen source, the resources are unlimited and give clean and high-power energy without giving off carbon dioxide. Hydrogen can be used in various ways, for example in fuel cells, in the synthesis of ammonia, in the purification of semiconductors, in the iron industry, in the food industry, as a fuel for automobiles and jet planes, and in the air-conditioning. To enable changing to a hydrogen culture, it is indispensable to establish an inexpensive method of the production of hydrogen in a large amount. Major techniques which are now under investigation include, for example, high-performance apparatuses for electrolyzing water, and thermochemical techniques that use a combination of several thermochemical reactions to decompose water while circulating reactants.

Among these studies for the production of hydrogen, there is a complete decomposition reaction of water using a photocatalyst, which can be directly combined with the use of the solar energy mentioned above. To overcome the energy problem using this reaction is a theme which should be pursued by human beings for ever, and it can solve the environmental problem at the same time.

SUMMARY OF THE INVENTION

An object of the present invention is to provide a method for producing hydrogen and oxygen photocatalytically from water in which the conversion efficiency of light energy is high and the reverse reaction is less.

Another object of the present invention is to provide a method for producing hydrogen and oxygen photocatalytically from water in which the catalyst is stable and is not deteriorated for a long period of time, and the preparation of the catalyst and the reaction conditions are simple.

Still another object of the present invention is to provide a method for producing hydrogen and oxygen photocatalytically from water in which the reaction is reproducible, the reaction proceeds catalytically, and no harmful or toxic substance is involved in the reaction.

A further object of the present invention is to provide a photocatalyst that is useful for the method above described.

Other and further objects, features, and advantages of the invention will appear more fully from the following description.

DETAILED DESCRIPTION OF THE INVENTION

The above object has been attained by a method for producing hydrogen and oxygen photocatalytically from water, which comprises bringing an aqueous solution of carbonate into contact with a semiconductor carrying a metal or a metal compound and irradiating the aqueous solution with light.

Now the present invention will be described in detail.

The semiconductor to be used in the present invention may be any type of compound if the following conditions are satisfied:

(1) the electric potential of the electrons produced by the irradiation with light is more negative than the electric potential that can reduce water;

(2) the electric potential of the positive hole produced by the irradiation with light is more positive than the electric potential that can oxidize water; and (3) the semiconductor itself is stable in the aqueous carbonate solution even under the irradiation with light.

As semiconductors for use in the present invention, there can be mentioned, for example $TiO_2$, $SrTiO_3$, $Ta_2O_5$, $ZrO_2$, $HfO_2$, $K_4Nb_6O_{17}$, $Na_2Ti_6O_{13}$, $K_2Ti_6O_{13}$, and $BaTi_4O_9$, with preference giving to $TiO_2$, $SrTiO_3$, $ZrO_2$, $Ta_2O_5$, $HfO_2$, $K_4Nb_6O_{17}$, and $K_2Ti_6O_{13}$. The form of semiconductor may be in powder, pellet, membrane, or the like. In the case of powder, the diameter of the particle of powder may be preferably 0.1 to 100 $\mu m$, more preferably 1 to 50 $\mu m$ though it is not limitative.

The metal that is carried on the semiconductor powder may be any element if the metal is stable in the aqueous carbonate solution even under the irradiation with light, such as Pt, Rh, Ni, Cu, and Ru. Further, the metal may be in any compound form, for example in the form of oxide such as $RuO_2$, if the compound facilitates the decomposition of water. The amount of the metal to be carried is selected optimally depending on the combination of the semiconductor and the oxide.

The metal or metal compound may be added to the semiconductor as a precursor and changed to the metal or metal compound in situ. The metal precursor may be in any compound form, for example the nitrates, the sulfates, or the organic acid salts.

As a process for preparing a semiconductor supporting the metal, usual any process, such as an impregnation process, a photoelectrical deposition process, a precipitation process, an ion exchange process, and a physical mixing process, can be employed. Additionally baking treatment is optionally employed. In the case of Ni, Cu, or the like, thereafter, reduction with hydrogen is carried out to prepare the intended catalyst. In the case of Ru, oxidation is further carried out. In the case of Pt, Rh, or the like, which can easily be photoelectrically deposited on a semiconductor, the metal precursor of the metals and the semiconductor are mixed with an aqueous solution of carbonate, followed by irradiation with light, so that the supporting of the metal on the carrier and the photolysis reaction of water can be carried out simultaneously and continuously by the irradiation with light.

As the carbonates, any compound that is a salt capable of forming a carbonate ion or a bicarbonate ion can be used. A salt having a large solubility, such as $Na_2CO_3$ and $K_2KO_3$, is preferable. Also a method wherein carbon dioxide is blown into an aqueous solution to produce these ions may be used.

Now the reaction conditions are described.

As the light source, one that can radiate light having energy higher than the band gap of the semiconductor can be used, such as a high-pressure mercury lamp, a xenon arc lamp, a tungsten arc lamp, and sunlight. The light is selected depending o the kind of semiconductor. A light having a wavelength of ultraviolet region, that is, 400 nm or shorter, is preferably used for the semiconductor enumerated above. The amount of light that irradiates the aqueous solution of carbonate is preferably set as large as possible. In other words, for example, in the case of an internal-irradiation-type reaction tube, 365 nm ray of 131 $mW/cm^2$ or more or 245 nm ray of 10 $mW/cm^2$ or more is preferably used. Of course, a light condensed by a lens or the like may be used. The reaction tube and the optical system are preferably those that can transmit light efficiently, that is, they are made, for example, of quartz.

As the method of the irradiation with light, any method, such as the internal irradiation method and the external irradiation method, can be used, and preferably the catalyst is irradiated with light as efficiently as possible. For example, the catalyst in powder form is well suspended by using a stirrer, or the catalyst is dispersed uniformly on the bottom of the reaction tube, and light is radiated from above or below. To radiate light efficiently, a thin membrane on which the catalyst is immobilized may be used.

The amount of the catalyst and the amount of water are optimally selected so that the light can be absorbed by the catalyst as efficiently as possible.

For example, the amount of semiconductor in the form of powder to be added may be within the range of amount that allow light transmit in the solution smoothly, and preferably 0.001 to 10 wt %, more preferably 0.01 to 1 wt %, based on water.

The metal or metal compound to be carried on the semiconductor may be 0.01 wt % or more, preferably 0.01 to 20 wt %, more preferably 0.03 to 5 wt %, in terms of metal based on the semiconductor.

Preferably the carbonate is used at a considerably high concentration. For example, a saturated carbonate aqueous solution (e.g., 18% solution of $Na_2CO_3$ and 52% solution of $K_2CO_3$) is most preferably used. Thus, the pH of the aqueous solution of the carbonate as a reaction solution that is determined by the carbonate concentration is usually an alkaline range over pH 8 or over.

If no carbonate is contained, no oxygen is produced. As for hydrogen, without carbonate it is produced a little in the initial stage of the reaction, but it is produced less and less with the passage of time. It is considered that this hydrogen is produced non-catalytically. However, along with the addition of a carbonate, production of oxygen begins and the rate of the production of the gas increases. Ultimately, in the steady state, the ratio of hydrogen to oxygen becomes about 2. The optimum amount of the carbonate can be adjusted in accordance with the particular catalyst. If the amount of the carbonate is too small, the time required to reach the steady state becomes prolonged, or oxygen is not produced, or the reverse reaction exceeds the extent to be ignored.

The photoreaction is preferably carried out under reduced pressure, for example, under such a pressure as slightly higher than the saturated vapor pressure of water. This is because the hydrogen and oxygen produced in the liquid phase are caused to be released into the gas phase as quickly as possible.

Water is a very stable material whose decomposition requires a great deal of energy. Photolyzing water by using a semiconductor has hitherto been considered to be a very difficult reaction. However, according to the present invention, water can be decomposed surprisingly readily into hydrogen and oxygen.

Further, the present invention can be applied to many semiconductors in general, and when a stable semiconductor responsive to visible light is developed in the future, the present invention will make it possible to photolyze water under the influence of visible light which is major part of sunlight.

Moreover if energy is supplied through the present invention in the future, by using the aqueous solution of carbonate a larger demand for carbon dioxide, which is a cause of warming the earth, is expected and a large amount of that carbon dioxide can be treated by immobilization and can be utilized effectively.

Now, the present invention will be described in more detail with reference to the following examples.

EXAMPLE 1

0.3 g of titanium dioxide (P-25, manufactured by Nippon Aerosil Corp.) carrying chloroplatinic acid in an amount of 3 wt % in terms of platinum thereon (particle diameter: about 10 μm), and 80 g of sodium carbonate were mixed into 350 ml of water, and the resulting mixture was placed in an internal-irradiation-type reaction tube (of quartz), which was set in a closed circulating system. In this case, the chloroplatinic acid is rapidly reduced to platinum by photoreduction reaction. The air in the gas phase and the liquid phase was removed, and then argon was introduced into the system, to bring the total pressure in the system to about 27 Torr. As a light source, a 400-W high-pressure mercury lamp (Riko Kagaku Inc.) was used, and light was radiated while the catalyst was being dispersed by a stirrer. The produced hydrogen and oxygen were qualitatively and quantitatively measured by gas chromatography and a pressure gauge.

In 5 hours after the start of the reaction, 690 μmol of hydrogen and 354 μmol of oxygen had been produced. Thereafter the activity improved little by little, and after 50 hours a steady state was reached. At that time the rate of the production of hydrogen reached 570 μmol/h, and the rate of the production of oxygen reached 290 μmol/h.

The above result is summarized in Table 1.

EXAMPLE 2

The hydrogen and the oxygen of the gas phase of the catalyst system of Example 1, wherein the activity reached a steady state, were removed and the photoreaction was carried out. After this procedure had been repeated 12 times, no deterioration of the catalyst was observed.

REFERENCE EXAMPLE

300 μmol of hydrogen and 150 μmol of oxygen were introduced into the gas phase of the reaction system of Example 1, and the closed system was allowed to stand without irradiation with light. At this time the rate of the reverse reaction of hydrogen, shown below, was 0.5 μmol/h, and the rate of the reverse reaction of oxygen was 0.3 μmol/h, which were very small in comparison with the rate of the decomposition rate of water.

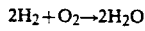

$$2H_2 + O_2 \rightarrow 2H_2O$$

That is, it was confirmed that the reverse reaction from the gas phase occurred little despite that the system contained platinum.

EXAMPLE 3

The procedure of Example 1 was repeated except that, instead of the sodium carbonate, 200 g of potassium carbonate was used. In 24 hours, 430 μmol of hydrogen and 203 μmol of oxygen had been produced. In the steady state, the reaction rate of hydrogen was 20 μmol/h and the reaction rate of oxygen was 10 μmol/h. The result is summarized in Table 1.

EXAMPLE 4

The procedure of Example 1 was repeated except that, instead of the sodium carbonate, 30 g of sodium bicarbonate was used. In 2 hours, 35 μmol of hydrogen and 16 μmol of oxygen had been produced. In the steady state, the reaction rate for hydrogen was 4 μmol/h and the reaction rate for oxygen was 2 μmol/h. The result is summarized in Table 1.

EXAMPLE 5

Titanium dioxide (P-25, manufactured by Nippon Aerosil Corp.) was impregnated with ruthenium chloride in an amount of 1 wt % in terms of Ru, and oxidation baking were carried out at 500° C.. 0.3 Gram of this catalyst (particle diameter: about 10 μm), 350 ml of water, and 80 g of sodium carbonate were mixed, and the mixture was placed in an internal-irradiation-type reaction tube (made of quartz), which was set in a closed circulating system. After the air in the gas phase and the liquid phase was removed, argon was introduced into the system, to bring the total pressure in the system to about 27 Torr. As a light source, a 400-W high-pressure mercury lamp (Riko Kagaku Inc.) was used and light was radiated while dispersing the catalyst with a stirrer. The produced hydrogen and oxygen were qualitatively and quantitatively measured by gas chromatography and a pressure gauge. In 67 hours after the start of the reaction, 2215 μmol of hydrogen and 1050 μmol of oxygen had been produced. Thereafter the activity improved little by little and after 10 hours a steady state was reached. At that time the rate of the production of hydrogen reached 34 μmol/h, and the rate of the production of oxygen reached 17 μmol/h. The result is summarized in Table 1.

EXAMPLE 6

$K_4Nb_6O_{17}$ was subjected to ion exchange with $[Pt(NH_3)_4]^{2+}$ in an amount of 3 wt % in terms of Pt. 1 g of the thus obtained catalyst (particle diameter: about 10 μm), 350 ml of water, and 80 g of sodium carbonate were mixed, and the mixture was placed in an internal-irradiation-type reaction tube (made of quartz), which was set in a closed circulating system. After the air in the gas phase and the liquid phase was removed, argon was introduced into the system, to bring the total pressure in the system to about 27 Torr. As a light source, a 400-W high-pressure mercury lamp (Riko Kagaku Inc.) was used and light was radiated while dispersing the catalyst with a stirrer. The produced hydrogen and oxygen were qualitatively and quantitatively measured by gas chromatography and a pressure gauge. In 21 hours after the start of the reaction, 1,930 μmol of hydrogen and 850 μmol of oxygen had been produced. At that time the initial production rate of hydrogen was 214 μmol/h, and the initial production rate of oxygen was 100 μmol/h. The result is summarized in Table 1.

EXAMPLE 7

Titanium dioxide (P-25, manufactured by Nippon Aerosil Corp.) was impregnated with nickel nitrate in an amount of 1 wt % in terms of Ni, followed by reduction with hydrogen at 450° C. for 3 hours. 0.3 g of this catalyst (particle diameter: about 10 μm), 350 ml of water, and 80 g of sodium carbonate were mixed, and the mixture was placed in an internal-irradiation-type reaction tube (made of quartz), which was set in a closed circulating system. After the air in the gas phase and the liquid phase was removed, argon was introduced into the system, to bring the total pressure in the system to about 27 Torr. As a light source, a 400-W high-pressure mercury lamp (Riko Kagaku Inc.) was used and light was radiated while dispersing the catalyst with a stirrer. The produced hydrogen and oxygen were qualitatively and quantitatively measured by gas-chromatography and a pressure gauge. In 16 hours after the start of the reaction, 710 μmol of hydrogen and 242 μmol of oxygen had been produced. At that time the rate of the production of hydrogen reached 150 μmol/h, and the rate of the production of oxygen reached 48 μmol/h. The result is summarized in Table 1.

EXAMPLE 8

0.5 g of $K_2Ti_6O_{13}$ carrying chloroplatinic acid in an amount of 1.5 wt % in terms of platinum thereon (particle diameter: about 10 μm), and 80 g of sodium carbonate were mixed into 350 ml of water, and the resulting mixture was placed in an internal-irradiation-type reaction tube (made of quartz), which was set in a closed circulating system. The air in the gas phase and the liquid phase was removed, and then argon was introduced into the system, to bring the total pressure in the system to about 27 Torr. As a light source, a 400-W high-pressure mercury lamp (Riko Kagaku Inc.) was used, and light was radiated while the catalyst was being dispersed with a stirrer. The produced hydrogen and oxygen were qualitatively and quantitatively measured by gas chromatography and a pressure gauge.

In 11 hours after the start of the reaction, 461 μmol of hydrogen and 121 μmol of oxygen had been produced. At that time the rate of the production of hydrogen reached 63 μmol/h, and the rate of the production of oxygen reached 17 μmol/h. The result is summarized in Table 1.

EXAMPLE 9

0.3 g of strontium titanate carrying rhodium chloride in an amount of 0.3 wt % in terms of Rh thereon (particle diameter: about 10 μm), and 40 g of sodium carbonate were mixed into 350 ml of water, and the resulting mixture was placed in an internal-irradiation-type reaction tube (made of quartz), which was set in a closed circulating system. The air in the gas phase and the liquid phase was removed, and then argon was introduced into the system, to bring the total pressure in the system to about 27 Torr. As a light source, a 400-W high-pressure mercury lamp (Riko Kagaku Inc.) was used, and light was radiated while the catalyst was being dispersed with a stirrer. The produced hydrogen and oxygen were qualitatively and quantitatively measured by gas chromatography and a pressure gauge.

In 28 hours after the start of the reaction, 251 μmol of hydrogen and 54 μmol of oxygen had been produced. At that time the rate of the production of hydrogen reached 48 μmol/h, and the rate of the production of oxygen reached 14 μmol/h. The result is summarized in Table 1.

EXAMPLE 10

Titanium dioxide (P-25, manufactured by Nippon Aerosil Corp.) was impregnated with copper nitrate in an amount of 1 wt % in terms of Cu, followed by reduction with hydrogen at 450° C. for 3 hours. 0.3 g of this catalyst (particle diameter: about 10 μm), 350 ml of water, and 40 g of sodium carbonate were mixed, and the mixture was placed in an internal-irradiation-type reaction tube (made of quartz), which was set in a closed circulating system. After the air in the gas phase and the liquid phase was removed, argon was introduced into the system, to bring the total pressure in the system to about 27 Torr. As a light source, a 400-W high-pressure mercury lamp (Riko Kagaku Inc.) was used and light was radiated while dispersing the catalyst with a stirrer. The produced hydrogen and oxygen were qualitatively and quantitatively measured by gas chromatography and a pressure gauge. In 22 hours after the start of the reaction, 152 μmol of hydrogen and 22 μmol of oxygen had been produced. At that time the rate of the production of hydrogen reached 9 μmol/h, and the rate of the production of oxygen reached 2 L μmol/h. The result is summarized in Table 1.

COMPARATIVE EXAMPLE 1

The procedure of Example 1 was repeated except that the sodium carbonate was not added. In 22 hours after the start of the reaction, 61 μmol of hydrogen had been produced. Thereafter the production rate of hydrogen was 0.4 μmol/h. The production of oxygen was not observed. The result is summarized in Table 1.

COMPARATIVE EXAMPLE 2

The procedure of Example 1 was repeated except that, instead of the sodium carbonate, 30.2 g of sodium hydroxide was used. In 24 hours after the start of the reaction, 339 μmol of hydrogen had been produced. The production rate of hydrogen gradually decreased. In 8 days after the start of the reaction, a total of 610 μmol of hydrogen had been produced. On the eighth day the production rate of hydrogen was 0.8 μmol/h. The production of oxygen was not observed. The result is summarized in Table 1.

TABLE 1

| Example | Catalyst | Additive | Rate of production (μmol/h) Hydrogen | Oxygen |
|---|---|---|---|---|
| 1 | Pt(0.3 wt %)—TiO$_2$ | Na$_2$CO$_3$(80 g) | 570 | 290 |
| 3 | Pt(0.3 wt %)—TiO$_2$ | K$_2$CO$_3$(200 g) | 20 | 10 |
| 4 | Pt(0.3 wt %)—TiO$_2$ | NaHCO$_3$(30 g) | 4 | 2 |
| 5 | RuO$_2$(1 wt %)—TiO$_2$ | Na$_2$CO$_3$(80 g) | 34 | 17 |
| 6 | Pt(3 wt %)/K$_4$Nb$_6$O$_{17}$ | Na$_2$CO$_3$(80 g) | 214 | 100 |
| 7 | Ni(1 wt %)—TiO$_2$ | Na$_2$CO$_3$(80 g) | 150 | 48 |
| 8 | Pt(0.15 wt %)—K$_2$Ti$_6$O$_{13}$ | Na$_2$CO$_3$(80 g) | 63 | 17 |
| 9 | Rh(0.3 wt %)—SrTiO$_3$ | Na$_2$CO$_3$(40 g) | 48 | 14 |
| 10 | Cu(1 wt %)—TiO$_2$ | Na$_2$CO$_3$(40 g) | 9 | 2 |
| Comparative example 1 | Pt(0.3 wt %)—TiO$_2$ | None | 0.4 | 0 |
| Comparative example 2 | Pt(0.3 wt %)—TiO$_2$ | NaOH(30.2 g) | 0.8 | 0 |

Note:
Amount of catalyst: 0.3 g (1 g in Example 6 and 0.5 g in Example 8)
Light source: 400-W high-pressure mercury lamp (internal irradiation)

Having described our invention as related to the present embodiments, it is our intention that the invention not be limited by any of the details of the description, unless otherwise specified, but rather be construed

What we claim is:

1. A method for producing hydrogen and oxygen photocatalytically from water, which comprises bringing an aqueous solution of carbonate having a pH greater than 8 into contact with a semiconductor carrying a metal or a metal compound and irradiating the aqueous solution.

2. The method as claimed in claim 1, wherein the semiconductor is selected from the group consisting of $TiO_2$, $SrTiO_3$, $Ta_2O_5$, $ZrO_2$, $HfO_2$, $K_4Nb_6O_{17}$, $Na_2Ti_6O_{13}$, $K_2Ti_6O_{13}$, and $BaTi_4O_9$.

3. The method as claimed in claim 1, wherein the metal or the metal in the metal compound is selected from the group consisting of Pt, Rh, Ni, Cu, and Ru.

4. The method as claimed in claim 1, wherein the metal compound is an oxide.

5. The method as claimed in claim 1, wherein the semiconductor is in a form of powder, pellet or membrane.

6. The method as claimed in claim 1, wherein powder of the semiconductor is suspended in the solution in the range of 0.001 to 10 wt %, based on the solution.

7. The method as claimed in claim 1, wherein the metal or metal compound carried on the semiconductor is in 0.01 wt % or more based on the semiconductor.

8. The method as claimed in claim 1, wherein the concentration of the carbonate is saturated or less in the aqueous solution.

9. The method as claimed in claim 1, wherein the carbonate is sodium carbonate or potassium carbonate.

10. The method as claimed in claim 1, wherein the carbonate solution is a saturated carbonate solution.

11. The method as claimed in claim 1, wherein the light having a wavelength of ultraviolet region is radiated.

12. The method as claimed in claim 1, wherein the reaction is carried out under reduced pressure.

* * * * *